Jan. 1, 1957

J. R. ANDERSON

DELAY LINES

Filed Jan. 26, 1953

2,776,411

INVENTOR
J. R. ANDERSON
BY James W. Falk
ATTORNEY 2,776,411

DELAY LINES

John Reid Anderson, Berkeley Heights, N. J., assignor to Bell Telephone Laboratories, Incorporated, New York, N. Y., a corporation of New York Application January 26, 1953, Serial No. 333,319

4 Claims. (Cl. 333—29)

This invention relates to electrical delay lines and more particularly to such electrical delay lines of the low pass filter type and wherein there is mutual coupling between certain successive inductance sections of the line.

Electrical delay lines are employed in a large number of electrical circuits and systems, such as for storage of information in digital computers, as an adjunct to some logic circuits, for conversion between parallel and serial operations, to construct word generators, in high speed telephone switching systems, etc. Recent trends in reduction in size of computer, logic and switching systems has made it desirable to attempt to reduce all other circuit components and networks in such systems, including the delay lines employed. Present delay lines generally require a relatively large volume per unit of delay, have high fabrication costs and may have such electrical disadvantages as limited storage capacity and appreciable attenuation.

In order to obtain a more linear phase versus frequency characteristic over the pass band of the delay line, it is known that it is desirable to utilize mutual coupling between sections of the delay line. This mutual coupling may be between only the pair of coils or inductance portions of each section of the line or may be between every inductance portion of the line. By determining this mutual coupling, one is able to obtain the characteristic desired for a particular application, within certain limits as imposed by unavoidable losses, etc. Thus a phase characteristic that is very close to linear over the first half of the pass band, but deviates therefrom over the second half may be obtained with one value of mutual coupling while, with a slightly higher value of mutual coupling in basically the same structure, the phase characteristic may be maintained closer to linear over a wider portion of the pass band but with more variation from linear than over the first half in the case mentioned above.

It is a general object of this invention to provide improved delay line structures.

More specifically objects of this invention include reducing the size of delay line structures, reducing the losses and providing higher Q's for such structures, enabling the determination of the mutual coupling in a simplified delay line structure, and improving the linear phase versus frequency characteristic in such a simplified structure.

The performance of any delay line, either of the lumped or distributed parameter type, is dependent upon the characteristics of the coils and the condensers or the distributed capacitances and inductances of the line and the geometry of the structure. In order to reduce the volume occupied by delay lines, fairly high dielectric constant materials should be used in the condensers and the coils should utilize magnetic materials. In specific embodiments of this invention, the coils are defined by a single wire extending through an aperture in a magnetic material, such as a block or slab of ferrite or compressed powdered iron or powdered Permalloy, formed by a slot cut into at least one of two mating surfaces of two such blocks or slabs. By employing but a single turn of wire for each inductance section of a lumped parameter delay line, the loss introduced by the wire is reduced to a minimum, which is another desideratum for delay lines. Further by employing ferrites the value of inductance will remain constant over a wide frequency band. Ferrite materials available commercially at this time have relatively constant permeabilities and low losses at frequencies above one megacycle.

By fabricating each inductance portion of the delay line as a single wire extending into a slot cut into at least one of two mating surfaces of two ferrite slabs or blocks, not only is the loss, and particularly the direct current winding loss, reduced to a minimum but the stray capacitances of the winding are also reduced to a minimum. Further an air gap is introduced in the magnetic circuit encompassing the single turn which considerably increases the Q of each inductance portion. This air gap is present between the mating surfaces of the two blocks or slabs. Additionally considerable ease of fabrication is attained as very small dimensioned apertures may readily be cut as a slot in a surface of one, or both, of the mating ferrite blocks or slabs. Thus not only is the fabrication of delay lines in accordance with this invention considerably simplified, but a high degree of accuracy in obtaining desired physical dimensions and electrical parameters is readily attained.

In specific embodiments of this invention wherein the inductance portions of the delay line are defined by single turns of wire extending between mating ferrite blocks or slabs, the mutual coupling between adjacent inductance portions can be readily predetermined by the spacing between the wires which have at least one ferrite member in common. Thus in one specific embodiment wherein mutual coupling between each pair of inductance portions only is desired, the two wires defining the inductances of theses portions are positioned between the same two ferrite blocks, as described above, but other pairs of inductance portions are positioned between other pairs of ferrite blocks and spaces exist between successive pairs of ferrite blocks. Advantageously in this specific embodiment, these spaces are defined by the condensers of the delay line.

In other specific embodiments of this invention wherein mutual coupling between each adjacent inductance portion is desired, all the individual wires defining the inductance portions have at least one ferrite slab in common. Thus in one specific embodiment the wires extend in parallel slots between but two ferrite slabs, the coupling factor being determined by the spacing between adjacent wires, while in another specific embodiment the wires extend in slots defined between a single common ferrite slab and a plurality of individual ferrite blocks positioned on the slab and mating therewith, air gaps being provided between the ferrite blocks to decrease the coupling factor to a desired value.

It is therefore a feature of this invention that a delay line comprise inductance portions each defined by a single wire extending within an aperture in a magnetic core encompassing the wire and more particularly that the wire extend within an aperture defined by a slot in at least one of two mating surfaces of blocks or slabs of the magnetic material.

It is a further feature of this invention that the mutual coupling or coupling factor between successive inductance portions thus defined be determined readily by the spacing between adjacent single wires extending within slots between ferrite slabs or blocks.

It is a still further feature of this invention that any number of the inductance portions of the delay line thus defined may have either one or both of the ferrite slabs or blocks in common. Thus it is a feature of one specific embodiment of this invention that each pair of inductance portions defined by two single wires be located between the same pair of ferrite blocks, but that the pairs of ferrite blocks be separate from each other. It is a feature of another specific embodiment of this invention that all the wire inductors be between the same ferrite slabs, while it is a feature of a third specific embodiment that all the wire inductors have one slab in common but individual ferrite blocks mounted on the slabs and mating therewith to complete the magnetic circuit of each wire inductance.

A complete understanding of this invention and of these and various other features thereof may be gained from the following detailed description and the accompanying drawing, in which.

Figures 1, 2, 3, 4, 5:
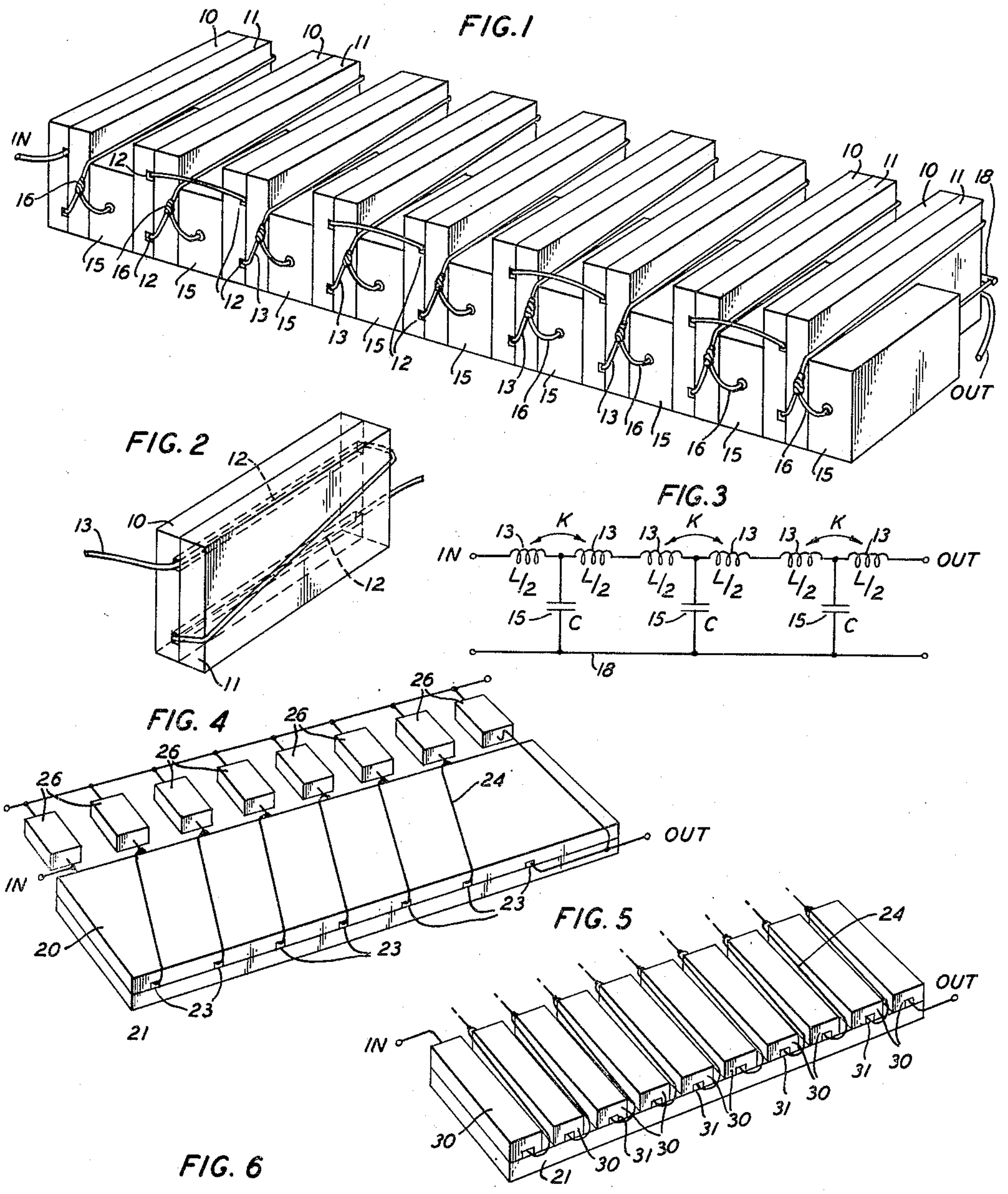
Fig. 1 is a perspective view of a delay line illustrative of one specific embodiment of this invention.
Fig. 2 is a perspective view of one pair of inductance elements of the delay line of Fig. 1.
Fig. 3 is a circuit schematic representation of the delay line of Fig. 1.
Fig. 4 is a perspective view of a delay line illustrative of another specific embodiment of this invention.
Fig. 5 is a perspective view of the inductance elements for a delay line illustrative of still another specific embodiment of this invention.

Turning now to the drawing, in the specific illustrative embodiment depicted in Fig. 1 the inductive elements of the delay line comprise a pair of ferrite blocks 10 and 11, at least one of the blocks being provided with slots 12, as best seen in Fig. 2, at their mating surfaces, and a single turn of wire 13 extending through the aperture thus formed. Advantageously two parallel apertures are thus provided by slots 12 and the two single turns of wire 13 provide the two inductance portions of each T-section of the delay line, the equivalent circuit for which is depicted in Fig. 3. Capacitors 15, which may advantageously be of the miniature molded mica type, are positioned between adjacent pairs of blocks 10 and 11 and are connected, as at 16, so that one turn of wire 13 extending between the ferrite blocks 10 and 11 is on either side of the point 16 of connection. The other side of each of the capacitors 15 is connected to a common ground wire 18.

The circuit representation of the specific embodiment of Fig. 1 is depicted in Fig. 3, and comprises a series of T-sections, the coupling between which is substantially eliminated due to the large space between adjacent pairs of ferrite blocks 10 and 11. The space is defined by the interposed condensers 15 thereby reducing the overall dimensions of the delay line. Each inductance portion L/2 of the T-sections comprises a single straight cylindrical conductor or wire 13 positioned in the slot 12 so as to be completely surrounded by magnetic material. These inductance portions have the advantages of a compact and simple construction requiring no coil winding and having almost negligible conductor losses. The Q's of these inductance portions are quite high due to the magnetic materials employed, and, by providing the apertures for the wires 13 by a slot formed between mating surfaces of two blocks or slabs, in accordance with one aspect of this invention, the Q of each inductance portion is considerably increased due to the slight air gap thus introduced into the magnetic circuit. This air gap is present at the mating surfaces of the magnetic or ferrite blocks and represents another important and advantageous feature of this invention. Further by employing inductive elements comprising a single wire or cylindrical conductor extending in a slot formed between mating surfaces of two ferrite blocks, in accordance with one aspect of this invention, winding losses and distributed capacitances are reduced to a minimum.

In the specific embodiment depicted in Fig. 1 the two inductance portions of each T-section of the delay line are two single wires extending in parallel slots 12 between mating surfaces of the same ferrite blocks 10 and 11. As the magnetic circuits encompassing the two single wires 13 are common elements, mutual coupling between the two wires will occur, and, as is known, can be utilized to improve the phase characteristic of the low pass filter or T-sections in the lumped parameter delay line. The coupling between the two inductive elements of each T-section will be determined by the spacing between the parallel conductors and the length of the conductors. In one specific embodiment I have found that for conductor lengths of about 0.7 inch a spacing between conductors of about 0.3 inch is required to give a coupling factor K of 0.2. In this specific embodiment the inductive elements were formed by cutting two slots 12 about 0.01 by 0.01 inch in a block of ferrite 10, placing insulated No. 33 wire through the 0.01 slots thus formed, and affixing the other ferrite block 11 onto block 10. In this embodiment wherein the ferrite blocks 10 and 11 were of a material known as ferroxcube IVC, an inductance of about 0.72 microhenry was obtained in an 0.7 inch length.

By this structure there is substantially no mutual coupling between sections of the lumped parameter delay line while the coupling between the adjacent portions of each section may readily be predetermined. I have found it advantageous in certain specific embodiments of this invention as depicted in Fig. 1 to employ coupling factors K of from 0.2 to 0.33 to attain very linear phase versus frequency characteristics, but this invention is not to be considered as limited to particular values of the coupling coefficient. However, a value of 0.2 for K is obtained when one solves mathematically for a nearly constant time delay versus frequency characteristic by eliminating higher order terms in the expression for delay time in an equivalent $m$ derived low pass filter section. Values of K greater than 0.2 may advantageously be used to reduce the amount by which the time delay departs from its average value at frequencies close to cut off.

Figure 6:
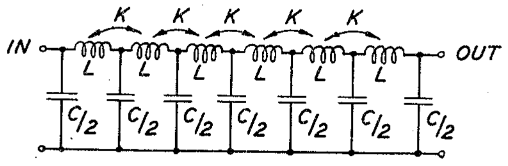
Fig. 6 is a circuit schematic representation of the delay lines of Figs. 4 and 5.

In other types of delay lines it is desirable to utilize mutual coupling between each adjacent coil section, a circuit schematic of such a delay line being shown in Fig. 6. Thus a delay line may be readily fabricated in accordance with this invention by employing two ferrite slabs 20 and 21, as shown in Fig. 4, having slots 23 formed at their mating surfaces through which a single wire 24 extends, the wire extending through each of the slots 23 in the same direction and around the back of slab 20. Capacitors 26 are connected between adjacent turns of the wire 24 adjacent the emergence of the wire from a slot 23 and a common or ground wire 27. By utilizing such a structure in accordance with this invention a large number of inductive elements, each comprising a distinct inductive section of the delay line, can be fabricated in the small space occupied by but two ferrite slabs 20 and 21. The mutual coupling K between adjacent sections is again determined by the spacing between conductors and the length of each turn within one of the parallel slots 23. While, in the structure depicted in Fig. 4, substantially any value of coupling factor K can be realized, a solution of the equation for delay time to give the most constant time delay versus frequency characteristic establishes that a coupling factor of about 0.1 is most advantageous for such a circuit. In the embodiment of Fig. 4 this can be readily attained by making the spacing between conductors relatively large, as of the order of ½ inch. Or, as depicted in Fig. 5, the coupling between adjacent inductance sections can be reduced considerably without increasing the overall volume of the delay line by having a single ferrite slab 21 and a plurality of mating ferrite blocks 30 each defining, at their mating surfaces, a slot 31 through which the wire 24 can extend, the ferrite blocks 30 being separated from each other by air spaces, as shown. By employing a single ferrite block 21 for a portion of the magnetic circuit encompassing each inductance, defined by the conductor 24 extending within the parallel slots 31, mutual coupling between successive inductance portions is attained but the magnitude of the coupling factor is more readily reduced and the overall dimensions of the delay line are smaller than in the embodiment of Fig. 4.

In delay lines in accordance with this invention, storage of better than thirty pulses is attainable, depending on the length of pulses stored and the total delay time. In a one-third microsecond delay a pass band of about fifteen or sixteen megacycles has been achieved. Delay lines in accordance with this invention having such characteristics would have an impedance of about 30 ohms to 100 ohms.

It is to be understood that the above-described arrangements are illustrative of the application of the principles of the invention. Numerous other arrangements may be devised by those skilled in the art without departing from the spirit and scope of the invention. Further while this invention has been described with reference to delay lines, it is to be understood that the novel structures of this invention are equally applicable to low pass filters employed for other than delay line purposes and thus the references to delay lines are descriptive of a maner of utilization of this invention but are not to be considered as limiting this invention to such utilization.

What is claimed is:

1. An inductance-capacitance delay line comprising a pair of slabs of a magnetic material having a high permeability and low loss at the freqeuncy of the delay line, said slabs being of the shape of parallelepipeds and being positioned adjacent each other to have common mating surfaces, being longer than they are wide, and defining a plurality of slots, greater than two, at their common mating surfaces, said slots extending across the width of said slabs from one edge to the opposite edge thereof, a single wire extending through each of said slots and defining the inductance portions of the line, said inductance portions being substantially solely defined by the sections of said wire within said slots, a common lead, and a capacitor element connected to said wire adjacent each point of emergence from said slots at one of said edges and connected to said common lead, the mutual coupling between adjacent inductance portions being substantially determined by the separation between said slots.

2. An inductance-capacitance delay line comprising a first slab of a magnetic material having a high permeability and low loss at the frequency of the delay line and at least one other slab of a magnetic material having a high permeability and low loss at the frequency of the delay line and positioned on said first slab, said slabs being of the shape of parallelepipeds and defining a plurality of slots, greater than two, at their common mating surfaces, said slots extending across the width of at least said first slab from one edge to the opposite edge thereof, a single wire extending through each of said slots and defining the inductance portions of the line, said inductance portions being substantially solely defined by the sections of said wire within said slots, a common lead, and a capacitor element connected to said wire adjacent each point of emergence of said wire from said slots at one of said edges, said capacitor elements also being connected to said common lead.

3. An inductance-capacitance delay line in accordance with claim 2 including a plurality of said other slabs each defining with said first slab one of said slots, the mutual coupling between adjacent inductance portions being substantially determined by the spacing between said slots and the air gaps between adjacent ones of said other slabs positioned on said one slab.

4. An inductance-capacitance delay line comprising a pair of mating parallelepiped shaped slabs of a magnetic material having a high permeability and low loss at the frequency of the delay line and providing a plurality of parallel slots at their common surface, said slots extending from one edge of said slabs to the opposite edge thereof, a single wire extending through each of said slots and defining the inductance portions of the line, said inductance portions being substantially solely defined by the sections of said wire within said slots, a lead, and capacity means connected between said lead and said wire adjacent one edge of said slabs, the mutual coupling between adjacent inductance portions being substantially determined by the spacing between said slots.

References Cited in the file of this patent

UNITED STATES PATENTS

| | | |
|---|---|---|
| 2,258,261 | Roosenstein | Oct. 7, 1941 |
| 2,390,563 | Tawney | Dec. 11, 1945 |
| 2,565,231 | Hepp | Aug. 21, 1951 |
| 2,613,268 | Jaspers | Oct. 7, 1952 |